United States Patent [19]

Hatta et al.

[11] 4,335,217

[45] Jun. 15, 1982

[54] SIC-SI3N4 COMPOSITE SYSTEM FOR SPECIAL HEAT-RESISTING CERAMIC MATERIALS AND ITS FABRICATION METHOD

[75] Inventors: Tokuaki Hatta; Haruyuki Ueno; Yuji Katsura; Kazushige Fukuda; Hiroshi Kubota, all of Kitakyushu, Japan

[73] Assignee: Kurosaki Refractories Co., Ltd., Fukuoka, Japan

[21] Appl. No.: 210,647

[22] Filed: Nov. 26, 1980

[30] Foreign Application Priority Data

Nov. 30, 1979 [JP] Japan .................................. 54-156032

[51] Int. Cl.$^3$ ........................ C04B 35/56; C04B 35/58
[52] U.S. Cl. ..................................................... 501/92
[58] Field of Search .................... 106/44, 55; 423/344, 423/345; 264/60

[56] References Cited

U.S. PATENT DOCUMENTS

| | | | |
|---|---|---|---|
| 3,853,567 | 12/1974 | Verbeek | 106/44 |
| 3,892,583 | 7/1975 | Winter | 106/44 |
| 4,097,294 | 6/1978 | Rice et al. | 106/44 |
| 4,127,411 | 11/1978 | Yajima et al. | 106/44 X |
| 4,177,230 | 12/1979 | Mazdiyasni | 423/344 |

Primary Examiner—G. O. Peters
Attorney, Agent, or Firm—Jordan and Hamburg

[57] ABSTRACT

A $SiC$-$Si_3N_4$ composite system for special heat-resisting ceramic materials which is fabricated by firing in a nitriding gas atmosphere a green compact prepared from and composed of, as starting materials, silicon powder and an organic silicon polymer containing carbon and silicon atoms as the major skeletal components, whereby said composite system, as a final fired compact has an interwoven texture of $SiC$ and $Si_3N_4$ with sufficient micro gaps to absorb thermal stresses, wherein the quantitative ratio by weight of $SiC$ to $Si_3N_4$ in said composite system being in the range of 5%-20%:95%-80%.

11 Claims, 4 Drawing Figures

A

—1μ

B

—1μ

SIC-SI3N4 COMPOSITE SYSTEM FOR SPECIAL HEAT-RESISTING CERAMIC MATERIALS AND ITS FABRICATION METHOD

BACKGROUND OF THE INVENTION

The present invention relates to a $SiC-Si_3N_4$ composite system for special heat-resisting ceramic materials and its fabrication method. The major object of the present invention is to provide a $SiC-Si_3N_4$ composite system for special heat-resisting ceramic materials having improved resistances to thermal shock and fracture due to thermal fatigue and its fabrication method. The special heat-resisting ceramic materials of the present invention can be produced by firing in a nitriding gas atmosphere a green compact composed of silicon powder and an organic silicon polymer containing silicon and carbon atoms as the major skeletal components such final fired compact can have the novel texture of interwoven SiC and $Si_3N_4$ is therein fired, resulting in markedly improved physico-chemical properties such as high resistances to thermal shock, to fracture due to thermal fatigue and to oxidation.

The organic silicon polymer referred to in the present invention has been originally invented by Prof. Seiji Yajima et al, Institute of Metallic Materials, Tohoku University as a family of organic silicon polymers containing silicon and carbon atoms as the major skeletal components. It is world-widely known that Prof. Yajima et al. have invented SiC fibers derived from such organic silicon polymers. There are now many relevant papers and patent specifications available on this invention. In addition, inspired by their invention, many relevant inventions have followed concerning the composition of SiC fibers with metallic or non-metallic materials, or the utilization of the organic silicon polymer as binding material for metallic or non-metallic powder and the employment of the organic silicon polymer as the starting material for SiC fired compacts, thus opening a new field in the researches of inorganic fibers, high-strength materials and heat-resisting materials.

SUMMARY OF THE INVENTION

A major object of the present invention is to provide a composite system for fabrication of special heat-resisting ceramic materials having markedly improved physico-chemical properties such as high resistances to thermal shock, to fracture due to thermal fatigue and to oxidation, employing above-mentioned silicon powder and the organic silicon polymer as starting materials. Basically, the organic silicon polymer employable in the present invention has the following unit structures (i) to (v):

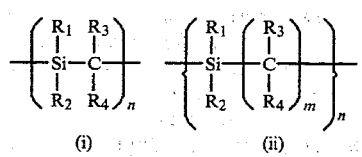

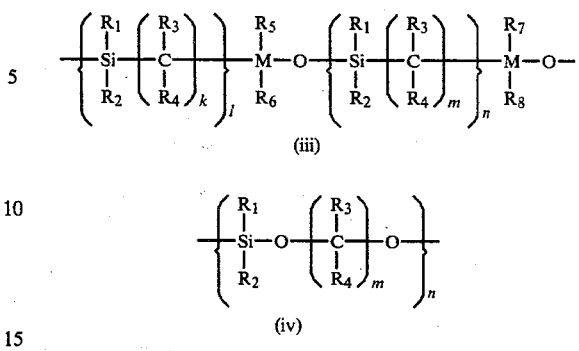

wherein $R_1$ is $-CH_3$; $R_2$, $R_3$ and $R_4$ may be a member or a mixture of at least two selected from the group consisting of hydrogen, alkyl, aryl, $(CH_3)_2CH-$, $(C_6H_5)_2SiH-$ and $(CH_3)_3Si-$. k, l, m and n are the mean number of repetitions of the unit structure in ( ) or { } and usually they are in the following ranges: $k=1-80$; $l=15-350$, $m=1-80$; $n=15-350$. The mean molecular weight of the polymer is in the range of 800–20000. In structure (iii), M is a metallic or non-metallic element and, for example, Si, B, Ti, Fe, Al, or Zr. It may be derive from the starting materials for preparation of the polymer having structure (iii) or from necessary catalysts. $R_5$, $R_6$, $R_7$ and $R_8$ may be a member or a mixture of at least two members selected from the group consisting of hydrogen, alkyl, aryl, $(CH_3)_2CH-$, $(C_6H_5)_2SiH-$ and $(CH_3)_3Si-$. Depending on the valency of M and the structure, any one or more of $R_5$, $R_6$, $R_7$ and $R_8$ may be absent.

(v) Compounds that contain any one or more of unit structures (i)–(iv) as partial unit structures in their chain or three-dimensional construction; or the mixture of such compounds.

DETAILED DESCRIPTION OF THE INVENTION

Figure 1:
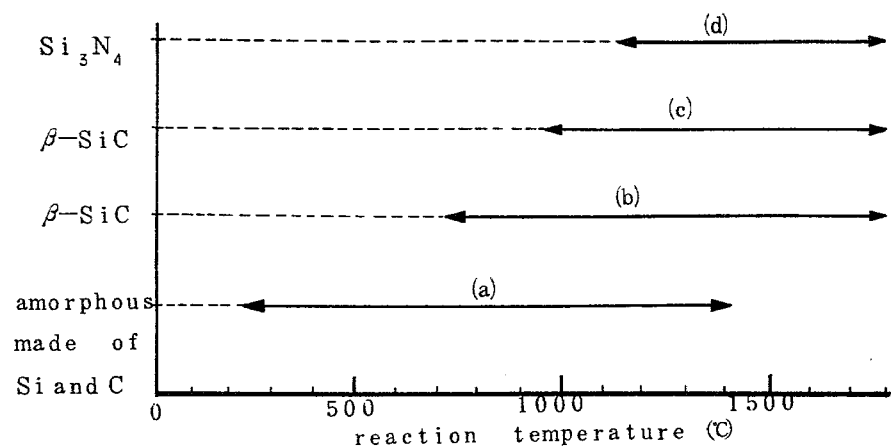
FIG. 1 explains the changes in the products synthesized from the organic silicon polymer and silicon particles in the compact with increasing temperature (temperature taken on abscissa; products taken on ordinate). The arrows define the range of synthesis of the relevant product. (a) shows the amorphous material of Si and C produced from the organic silicon polymer by thermal denaturation; (b) $\beta$-SiC derived from (a); (c) $\beta$-SiC produced anew by reaction of Si particles with excess carbon derived from (a); and (d) $Si_3N_4$ produced by reaction of $N_2$ gas with silicon particles that are not involved in (c).

Prof. Yajima et al. have discovered that the heat treatment of the organic silicon polymer in the non-oxidative atmosphere produces amorphous Si-C material which is further transformed to β-SiC containing free carbon.

From the viewpoint of energy saving, various parts of heat engines have now been reexamined for improved thermal efficiency. In this line of approach, the recent research activity has switched from metallic materials to heat-resisting ceramics which can withstand high temperature. Among possible non-oxide compounds, nitrides (for example, $Si_3N_4$, sialon and AlN) and carbides (for example, SiC) are particularly sought after since these materials are stable and have high strength and resistance to thermal shock at high temperature atmosphere. Furthermore, refractories or refractory material made of or containing such nitrides or carbides are also under extensive research activities.

In the course of research which has aimed at the mineralization of the organic silicon polymer for the production of ceramics, the present inventors have found that when SiC and $Si_3N_4$ are produced by reaction in the above promising ceramics, such that they coexist in the same texture, such ceramics could, among others, provide far better resistances to thermal shock as well as to fracture due to thermal fatigue than those of the ceramics which contains either one of the components. It is considered that the texture of the ceramic body plays a decisive role for providing resistances to thermal shock and to fracture due to thermal fatigue. Conventionally, $Si_3N_4$ and SiC materials are fabricated by hot-press sintering, normal-pressure-sintering or reaction-sintering and these methods provide the ceramics physico-chemical properties specific to respective methods. As $Si_3N_4$ and SiC have poor intrinsinc self-sinterability, it is very difficult to avoid the liquid-phase sintering of the second-phase-glassy dispersoid by fabrication methods other than reaction-sintering. When the amount of the second-phase-glassy dispersoid is large, it is very easy to sinter. However, the final composite system suffers from the deteriorated physico-chemical properties as high temperatures, so that it cannot serve as special heat-resisting material or high-temperature structural material. For reduction of the second-phase glassy dispersoid, devitrifaction and solid solution are utilized. For instance, at an initial stage of $Si_3N_4$ study, MgO was found to be useful as binder. However MgO has worked in its entirety as the glassy-dispersoid phase to bind $Si_3N_4$ particles, simply providing high densification. $Y_2O_3$ with or without $Al_2O_3$ can produce the devitrifaction phase, but does not lead to the complete absence of the glassy-dispersoid phase. In other words, high-density $Si_3N_4$ thus obtained unavoidably suffers from sharp lowering of strength at a temperature above 800° C. to 1000° C.

High-temperature strength, environmental stability, thermal-stress resistance and anti-creeping property are essential properties for special heat-resisting materials and high-temperature structural materials. As far as ceramics are concerned, resistance to thermal stresses is the most important property among them. In general, thermal stresses are classified into the drastically changing stress that is observed on rapid heating and cooling and the repeated stress that occurs on temperature variation. In metallic materials which have plasticity to some extent, plastic deformation serves to reduce such stresses. whereas ceramics, particularly highly covalent materials, have no such function (plastic deformation) as in metals having the metallic bond, because the type of chemical bondage is fundamentally different. Thus final fired products (ceramics) of high-density having the continuous bondage are very poor in resistance to thermal stresses.

The present inventors have found it possible to confer a buffering function to such brittle (high prone to thermal stresses) ceramics by texture control. Particularly we have succeeded in synthesizing in the same texture both $Si_3N_4$ and SiC which have excellent physico-chemical properties such as high-temperature strength, environmental stability and resistance to abrasion in spite of the low coefficient of thermal expansion whereby the micro gaps produced between $Si_3N_4$ and SiC is used to absorb thermal stresses. More concretely speaking, a mixture of silicon powder and the organic silicon polymer as the starting material is molded and then subjected to the heat treatment at a temperature from 800° C. to 1800° C. in nitrogen gas atmosphere or nitrogen-ammonia gas mixture atmosphere. Due to their heat treatment, β-SiC is formed from the organic silicon polymer and also by the reaction of the silicon powder with the released carbon. Furthermore $N_2$ reacts with Si to form $\alpha$-$Si_3N_4$ and $\beta$-$Si_3N_4$. Microcrystals (less than tens of micron in diameter) of SiC, $\alpha$-$Si_3N_4$ and $\beta$-$Si_3N_4$ are present in the form of interwoven texture without chemical bondage and/or without solid solution among them, resulting in the micro gaps formation between SiC and $Si_3N_4$. The final fired product thus obtained has interwoven texture of SiC and $Si_3N_4$ with appropriate gaps therebetween.

Conventional SiC-$Si_3N_4$ composite systems were, for example, fabricated by firing a mixture of silicon powder with SiC powder or SiC fibers in a nitrogen gas atmosphere at a temperature above 1200° C. (reaction-sintering); or sintering a mixture of $Si_3N_4$ powder and SiC powder or fibers with a $Si_3N_4$-sintering agent (for example, MgO, $Al_2O_3$ and $Y_2O_3$) at a temperature of about 1600° C. (hot-press sintering); or baking a mixture of $Si_3N_4$ and the organic silicon polymer in a non-oxidizing gas atmosphere at a temperature in the range of 1000° C. to 1800° C. (Japanese laid open publication 154816/1977 and Japanese laid open publication 28309/1979).

The SiC-$Si_3N_4$ composite system of the present invention fundamentally differs from traditional SiC-$Si_3N_4$ composite materials in the fact that SiC and $Si_3N_4$ have interwoven texture with appropriate micro gaps to absorb thermal stresses. In other words, traditional SiC-$Si_3N_4$ composite materials have no such interwoven texture in the final fired products, because the size and form of SiC and $Si_3N_4$ in the starting material determine the final structure and texture of the fired products.

The fabrication process of the present invention will be explained in detail hereinafter with the organic silicon polymer and silicon powder as the starting material.

When a green compact made of the mixture of the organic silicon polymer and silicon powder is fired in a nitriding gas atmosphere, the organic silicon polymer primarily turns to a liquid of a low vicosity at a relatively low temperature (around 300° C.). At this stage, substituents $R_1$-$R_8$ in structures (i)-(v) of the organic silicon polymer (hydrogen, alkyl, aryl, $(CH_3)_2CH—$, $(C_6H_5)_2SiH—$, $(CH_3)_3Si—$ and the like) escape as volatile compounds, while the skeletal components of carbon and silicon become amorphous. $\beta$-SiC begins to form without crystal lattice around 800° C. in the order of few to hundreds molecules from amorphous Si and C. In other words, few to hundreds of $\beta$-SiC molecules are scatteredly present in an amorphous mixture of Si and C, the mixture with an excessive amount of C. At a temperature above 1000° C., the production of $\beta$-SiC is further accelerated by the reaction of silicon powder with excess carbon. More particularly, the silicon particles in the compact react with excess carbon that is previously produced from the organic silicon polymer on thermal denaturation, providing $\beta$-SiC which then chemically binds with the initially produced $\beta$-SiC in the amorphous material between the silicon particles. Above 1200° C., while $\beta$-SiC is produced by thermal denaturation of the organic silicon polymer and also by reaction of silicon particles with excess carbon, the silicon powder particles that are not involved in the above reaction with excess carbon start to react with $N_2$ gas to yield $Si_3N_4$. After these processes, the reaction temperature is raised above the melting point of Si so that no silicon molecules remain unreacted without nitriding in the final fired product. It should be noted, however, that a high temperature above 1800° C. will cause the decomposition of $Si_3N_4$, giving the porous texture.

FIG. 1 summarizes the above-described processes of reaction. In FIG. 1, the transformation of products from the green compact made of the mixture of the organic silicon polymer and silicon particles is presented with increasing temperature of the reaction (reaction temperature taken on abscissa; reaction products taken on ordinate). The arrows defines the range of temperature in which each listed product was produced. The range was determined by X-ray diffraction. (a) is the amorphous material of silicon and carbon formed from the organic silicon polymer by thermal denaturation; (b) is $\beta$-SiC derived from (a); (c) is a new $\beta$-SiC produced by reaction of the silicon particles in the compact with excess carbon of (a); (d) is $Si_3N_4$ obtained by reaction of $N_2$ gas with the silicon particles that are not involved in (c).

In the reaction processes summarized above, the silicon particles are attacked from their surface by excess carbon derived from the organic silicon polymer at reaction stage (c) of FIG. 1 and thus lose their original shape, forming the chemical bondage with (a) and (b) of FIG. 1. Namely, $\beta$-SiC of (a)–(c) and the SiC amorphous material tridimensionally penetrate the space between silicon particles in the compact and form the chemical bondage with them. At stage (d) the unreacted silicon particles are nitrided to give $Si_3N_4$ which constructs the interwoven texture with $\beta$-SiC without chemical linkage. This was experimentally confirmed.

The SiC-$Si_3N_4$ composite material obtained by the above processes contains no such oxidative glassy-dispersoid phase as is observed in the hot-press or atmospheric-pressure-sintered $Si_3N_4$ compacts which is a major cause for the reduced strength at a high temperature. In addition, compared with traditional SiC-$Si_3N_4$ composite materials that are largely governed by the particle size, shape and mixing of starting materials, the special heat-resisting ceramics of the present invention show a markedly improved high-temperature strength and resistances to thermal shock and fracture due to thermal fatigue.

The advantages of the SiC-$Si_3N_4$ composite system of the present invention will be elucidated in the following examples.

EXAMPLE 1

The mixed organic silicon polymer of unit structures (i) and (ii) and 99.3% pure silicon powder (particle size <44μ) were mixed at mixing ratios listed in Table 1 and then fired as described below. A tetrahydrofuran solution of the organic silicon polymer and the silicon powder (particle size <44μ) were mixed for 5 hours in a hardened stainless steel pot mill. After the tetrahydrofuran was evaporated off, the mixture was compacted to a rectangular plate of 20×20×80 mm at a molding pressure of 800 kg/cm². The compact was heated to 1500° C. in the atmosphere of nitrogen gas at a heating speed of 100° C./hour and held for 10 hours at the above temperature. The fired plate was gradually cooled in the furnace and then subjected to physico-chemical measurements. Table 1 shows the results of measurements and Table 2 presents the quantitative ratios of the formed phases. The results in Table 2 were calculated from the calibration curve which was prepared with crystobaryte as the standard material by X-ray diffraction. However, as the strongest peak of $\beta$-SiC (d=2.51 Å) is least reproducible between the peaks of $\alpha$-$Si_3N_4$ and $\beta$-$Si_3N_4$, a peak of d=1.54 Å was employed for measurement.

TABLE 1

| specimen numbers | silicon powder wt % | organic silicon polymer wt % | bulk specific gravity | open porosity % | bending* strength kg/mm² |
| --- | --- | --- | --- | --- | --- |
| 1 | 95 | 5 | 2.49 | 19.2 | 30.0 |
| 2 | 90 | 10 | 2.54 | 16.7 | 28.3 |
| 3 | 80 | 20 | 2.64 | 13.4 | 27.4 |
| 4 | 65 | 35 | 2.73 | 7.9 | 29.3 |
| 5 | 60 | 40 | 2.23 | 26.2 | unmeasurable** |

Note:
*The bending strength was measured at a span distance of 30 mm using a cut specimen of 5 × 5 × 50 mm.
**As much volatile product occurred from the organic silicon polymer, the fired plate became highly porous and deformed.

TABLE 2

| specimen numbers | silicon powder wt % | organic silicon polymer wt % | $\beta$-SiC wt % | $\beta$-$Si_3N_4$ wt % | $\alpha$-$Si_3N_4$ wt % | Si wt % |
| --- | --- | --- | --- | --- | --- | --- |
| 1 | 95 | 5 | 2.7 | 70.0 | 24.8 | less than 0.5 |
| 2 | 90 | 10 | 5.1 | 63.2 | 30.1 | less than 0.5 |
| 3 | 80 | 20 | 11.0 | 59.5 | 27.3 | less than 0.5 |
| 4 | 65 | 35 | 20.5 | 46.7 | 29.8 | 1.2 |
| 5 | 60 | 40 | 24.9 | 15.1 | 54.2 | 7.3 |

With the above-defined organic silicon polymer, the upper limit of its content in the composition was 35 wt.%. In other words, the production of $\beta$-SiC should be maintained below 20.5 wt.%. Otherwise, the final fired product deformed.

EXAMPLE 2

Fired products Nos. 1–4 listed in Tables 1 and 2 were tested for resistance to thermal shock as described below. A rectangular specimen of 5×10×30 mm was cut and then held at 1200° C. for 20 minutes in the stream of nitrogen gas in a circular electric furnace. By tilting the furnace, the hot specimen was abruptly cooled in running water. After 10 minutes' cooling in running water, the plate was made dry and painted with various dyes for detection of a crack. The above thermal treatment was repeated until a crack was found in the specimen. Resistance to thermal shock was judged on the number of repetitions of the thermal treatment necessary for occurrence of cracks. The results of test are summarized in Table 3.

In contrast to the composite material of the present invention, traditional materials ((a) reaction-sintered $Si_3N_4$; (b) reaction-sintered SiC; (c) reaction-sintered SiC with bound $Si_3N_4$; (d) hot-pressed $Si_3N_4$ with addition of MgO; (e) hot-pressed SiC with addition of $B_2O_3$) were similarly subjected to the thermal shock test. Table 4 shows the test results.

TABLE 3

|  | specimen numbers (product) of the present invention | | | |
|---|---|---|---|---|
|  | 1 | 2 | 3 | 4 |
| resistance to thermal shock (number of repetitions of the thermal treatment) | 9 | 28 | 33 | 39 |

TABLE 4

|  | product of the present invention (No. 3) | a | b | c | d | e |
|---|---|---|---|---|---|---|
| open porosity (%) | 12.9 | 21.3 | 18.2 | 12.3 | 1.7 | 3.2 |
| bending strength (room temperature) (kg/mm$^2$) | 28.1 | 19.8 | 12.2 | 15.6 | 49.9 | 37.3 |
| modulus of rupture (1400° C.) (kg/mm$^2$) | 26.5 | 20.1 | 13.1 | 14.3 | 27.6 | 21.1 |
| resistance to thermal shock (number of repetitions of the thermal treatment) | 35 | 5 | 8 | 10 | 3 | 4 |

These results indicate that the formation of β-SiC in the final fired product below 5% by weight (specimen No. 1) resulted in poor resistance to thermal shock.

Thus the favorable effect of β-SiC in the final fired product starts to appear at 5 wt.% and ends at an upper limit of 20 wt.%, as is apparent from Example 1. The clear advantage of the product of the present invention over traditional $Si_3N_4$, SiC and SiC-$Si_3N_4$ composite materials can be seen in about 3-fold increase in resistance to thermal shock.

EXAMPLE 3

The product of the present invention (specimen No. 3) and reference materials (a)–(e) listed in Example 2 were tested for resistance to fracture due to thermal fatigue as described below. A rectangular plate of 5×5×50 mm was cut out of the final fired product and 1% of the flexural strength was applied as an initial load through the head (r=1 mm) positioned in the middle of the 30 mm span. With the total flexure limited to 10μ, the specimen plate was pulsated while the head followed the resulting displacement. The above-described test conditions were reproduced in a furnace which was maintained at 1300° C. The specimen plate was pulsated at a speed of 30 pulsations/second. Table 5 shows the number of pulsations until the specimen plate was fractured, or non-followability of the test head.

TABLE 5

|  | product of the present invention (specimen No. 3) | a | b | c | d | e |
|---|---|---|---|---|---|---|
| number of pulsations necessary for fracture | more than 4 × 10$^7$ | 2-4 × 10$^4$ | 6-8 × 10$^5$ | 2-5 × 10$^5$ | — | — |
| note | unbreakable | broken | broken | broken |  | incomparable because of large deformation |

Superiority of the material of the present invention to traditional $Si_3N_4$, SiC and SiC-$Si_3N_4$ composite systems was clearly recognized in resistance to fracture due to thermal fatigue.

EXAMPLE 4

The material of the present invention (specimen No. 3) in Example 2 was used to fabricate a tubular fired object (outer diameter 150 mm; thickness 5 mm; length 550 mm) by extrusion-molding. For comparison, the tubular fired objects of the same size were prepared with (a) reaction-sintered $Si_3N_4$, (b) reaction-sintered SiC and (c) reaction-sintered SiC with bound $Si_3N_4$. The inner surfaces of the tubes were subjected to the test for resistance to repeated heating. Using an oxygen-propane burner placed at one end of the tubular burned object, the flame passing through the tube was appropriately adjusted so that the temperature of the flame reached a maximum in the middle of the tube. The maximum temperature was measured to be 1480°–1530° C. with an optical pyrometer. After the flame was passed through the tube for 5 minutes, the burner was removed and the test tubular fired object was allowed to cool for 5 minutes. The above heat treatment was repeated until a crack was produced on the test surface and the number of repetitions of the heat treatment was recorded, Table 6 gives the test results.

TABLE 6

|  | product of the present invention (specimen No. 3) | a | b | c |
|---|---|---|---|---|
| number of repetitions of the heat treatment necessary for crack | 380 ∫ more than 410 | 85 ∫ 98 | 82 ∫ 105 | 73 ∫ 121 |

TABLE 6-continued

| | product of the present invention (specimen No. 3) | a | b | c |
|---|---|---|---|---|
| production | | | | |

The excellent property of the product of the present invention is very apparent from Table 6. The final fired object of the present invention produced no crack even after repeated heat treatments for three days, whereas the reference products gave clear cracks.

It is apparent from the above-described findings that in comparison with traditional $Si_3N_4$, SiC and SiC-$Si_3N_4$ composite systems, the new material of the present invention derived from the organic silicon polymer and silicon powder has markedly improved properties in resistance to thermal shock and fracture due to thermal fatigue.

These improved properties of the product of the present invention can be attributed to the interwoven microstructure or complicated texture of $Si_3N_4$ (produced from silicon powder by nitriding) with $\beta$-SiC (produced from the organic silicon polymer by thermal denaturation; and produced by reaction of silicon particles with excess carbon derived from the said polymer).

Figure 2:
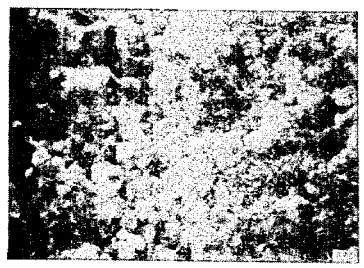
FIG. 2 reproduces the micrographs of the cracking surfaces taken with a scanning electron microscope. (A) is the material of the present invention in Example 4 and (B) reaction-sintered $Si_3N_4$.
Figure 2:

FIG. 2 shows the micrographs of the cracking surfaces of the material of the present invention (A) and reaction-sintered $Si_3N_4$ (B) taken with a scanning electron microscope. As is apparent from the microstructure of the material of the present invention, $Si_3N_4$ crystals are surrounded by $\beta$-SiC produced from the organic silicon polymer and by $\beta$-SiC produced by reaction of silicon particles with excess carbon derived from the said polymer, forming very complicated, interwoven patterns of $\beta$-SiC among $Si_3N_4$ crystals. In contrast, reaction-sintered $Si_3N_4$ shows sharp crystals of $Si_3N_4$ without stuffing inbetween.

Figure 3:
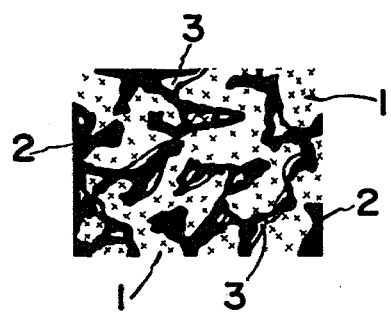
FIG. 3 presents a bidimensional model of the microstructure of (A) in FIG. 2. (1) is $Si_3N_4$; (2) $\beta$-SiC; and (3) a pore.

FIG. 3 is a bidimensional model of the microstructure of (A) considered easily from the micrograph in FIG. 2. In FIG. 3, the symbols have the following meanings: ▢ $\beta$-SiC; ▨ $Si_3N_4$ crystals or micro-agglomerates; ☐ pores.

As $\beta$-SiC and $Si_3N_4$ interweave each other without chemical binding on the surface of their contact in the micro-crystal region, micro gaps are necessarily formed which give a dimensional effect for absorption of thermal stresses.

EXAMPLE 5

Figure 4:
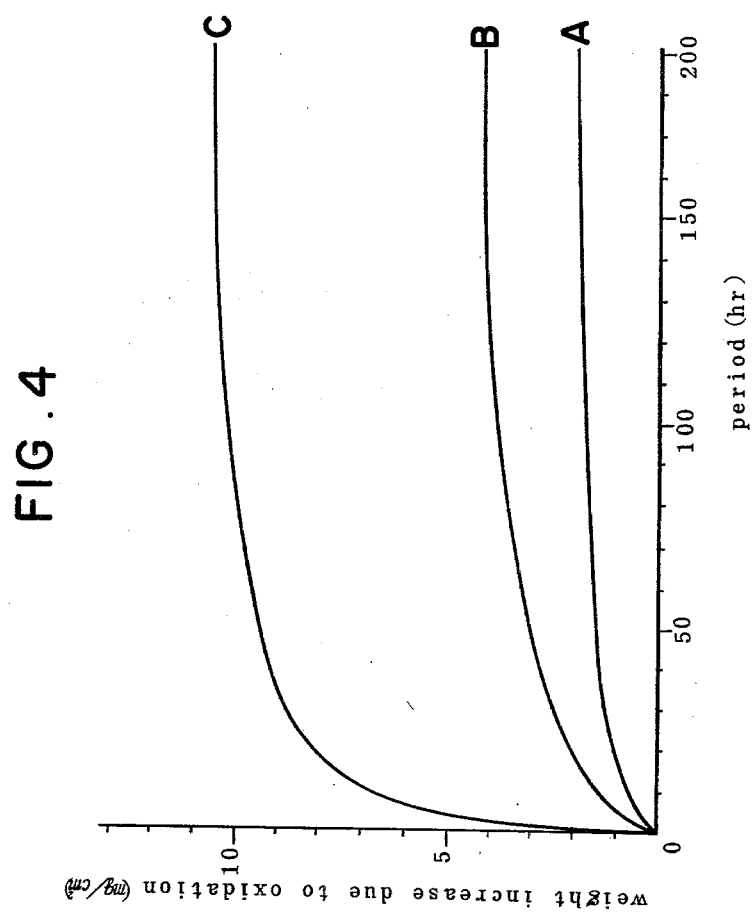
FIG. 4 explains the difference in resistance to oxidation of the material of the present invention (A) in Example 5 from the conventional product. The abscissa shows the period of time in hours and the ordinate the weight increase due to oxidation ($mg/cm^2$). (B) is hot-pressed $Si_3N_4$ with addition of $Al_2O_3$ and $Y_2O_3$; and (C) reaction-sintered $Si_3N_4$.

The material of the present invention was tested for resistance to oxidation as described below. The test was carried out at 1400° C. for 200 hours in the stream of dry oxygen in a circular electric furnace. A 5×5×20 mm sample plate was cut out and polished with 0.5$\mu$ diamond paste particles. The surface area was measured with a micrometer. For determination of resistance to oxidation, the weight increase in the unit area (1 cm$^2$) was measured initially five times in the first 60 hours (every 12 hours) and then once every 24 hours. The sample plate was supported on a knife edge of compact alumina. The test results are shown in FIG. 4 where the ordinate represents the weight increase in the unit area (mg/cm$^2$) and the abscissa the period of time in hours, A is the material of the present invention; B being the hot-pressed $Si_3N_4$ with addition of $Al_2O_3$ and $Y_2O_3$ (open porosity 1.4%); and C being the reaction-sintered $Si_3N_4$ (open porosity 22.7%).

In comparison with hot-pressed $Si_3N_4$ with addition of $Al_2O_3$ and $Y_2O_3$, the material of the present invention showed about 2-fold higher resistance to oxidation.

As described above in details, the present invention provides the SiC-$Si_3N_4$ composite system for special heat-resisting ceramics having improved resistances to thermal shock and to fracture due to thermal fatigue and high resistance to oxidation, which is produced by nitriding a molded object composed of the organic silicon polymer and silicon powder as the strating materials. These improved properties can be attributed to the new microstructure of interwoven SiC and $Si_3N_4$ in the microcrystal region (less than tens of micron in diameter) containing appropriate micro gaps for absorption of thermal stresses, which has never been observed in conventional SiC-$Si_3N_4$ composite materials.

As reaction-sintering is employed in the present invention, many molding methods such as extrusion-molding, injection-molding, casting-molding, isostatic-press-molding and die-press-molding can be utilized. In addition, as the final product can take any shape, the present invention is widely applicable for special heat-resisting materials and high-temperature structural materials. Furthermore the nitriding procedure may be divided into several steps for easier mechanical works such as thread cutting, which results in more complicated shapes of the final products.

The improved strength of the material of the present invention can advantageously be utilized as substitutes for high-temperature metal parts in automobile engine parts, heat exchange pipes, turbine parts, radiant tubes jigs and supports. The excellent resistances of the material of the present invention to thermal shock and fracture due to thermal fatigue can effectively be utilized in various industrial fields such as ceramic manufacture, atomic energy utilization, chemistry, industrial chemistry and steel-making industries.

What is claimed is:

1. An SiC-$Si_3N_4$ composite system for heat resistant materials, comprising crystals of $\beta$-SiC, $\alpha$-$Si_3N_4$ and $\beta$-$Si_3N_4$, said $\alpha$-$Si_3N_4$ and $\beta$-$Si_3N_4$ crystals being surrounded by said $\beta$-SiC crystals forming interwoven textures of $\beta$-SiC among said $\alpha$-$Si_3N_4$ and $\beta$-$Si_3N_4$ crystals without chemical bonding to provide micro gaps between said $\beta$-SiC and said $\alpha$-$Si_3N_4$ and $\beta$-$Si_3N_4$ crystals for absorption of thermal stresses.

2. The composite system of claim 1 wherein the weight ratio of SiC:$Si_3N_4$ is in the range of 5%–20%:9-5%–80%.

3. The composite system of claim 2 which is fabricated by firing in a nitriding gas atmosphere, a green compact composed of silicon powder and an organic silicon polymer containing structural units selected from the group consisting of:

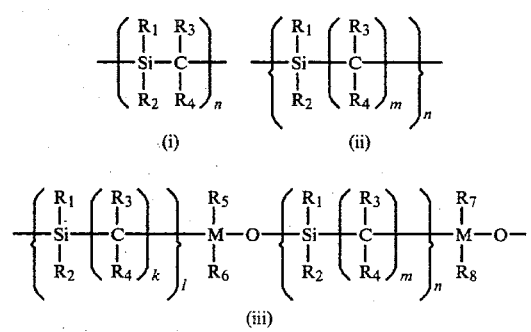

-continued

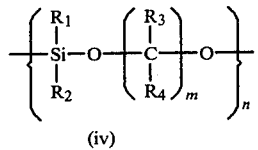

(iv)

and mixtures thereof, with any one or more of structural units (i)–(iv) forming part of a larger polymeric chain, wherein $R_1$ is $CH_3$, $R_2$, $R_3$, and $R_4$ are selected from the group consisting of hydrogen, alkyl, aryl, $(CH_3)_2CH-$, $(C_6H_5)_2SiH-$, $(CH_3)_3Si-$, and mixtures thereof, k, l, m, and n represent mean number of repetitions of the respective structural units, and in structural unit (iii), M is either a metallic or non-metallic element, $R_5$, $R_6$, $R_7$ and $R_8$ are selected from the group consisting of hydrogen, alkyl, aryl, $(CH_3)_2CH-$, $(C_6H_5)_2SiH-$, $(CH_3)_3Si-$, and mixtures thereof.

and depending on the valency of M, any one or more of $R_5$, $R_6$, $R_7$ and $R_8$ may be absent from the polymeric chain.

4. The composite system of claim 3 wherein k=1–80, l=15–350, m=1–80, n=15–350, with the mean molecular weight of the polymer in the range of about 800–20,000.

5. The composite system of claim 4 wherein M is selected from the group consisting of Si, B, Ti, Fe, Al, Zr, and mixtures thereof.

6. The composite system of claim 4 wherein said silicon powder has a particle size equal to or less than about 44 microns, and the mixing ratio by weight of silicon powder: organic silicon polymer is in the range of 90%–65%:10%–35%.

7. The composite system of claim 6 wherein the green compact is fired up to a temperature in the range of 1200° C. to 1800° C.

8. The composite system of claim 7 wherein:
(A) the green compact is initially fired to a temperature above about 300° C. wherein the organic silicon polymer turns to a low viscosity liquid, and substituents $R_1$–$R_8$ of structural units (i)–(iv) escape as volatile compounds, with skeletal components of carbon and silicon becoming amorphous;
(B) the compact is fired to a temperature above about 800° C. wherein β-SiC crystals begin to form in the amorphous mixture of silicon and an excess of carbon;
(C) the compact is fired to a temperature above about 1,000° C. wherein β-SiC crystal formation is accelerated by reaction of the silicon powder with an excess of carbon, said β-SiC crystals formed in step (C) chemically binding with the β-SiC crystals produced in step (B) in the amorphous structure between the silicon particles;
(D) the compact is fired to a temperature above about 1200° C. wherein
  (1) β-SiC is produced by thermal denaturation of the organic silicon polymer and by reaction of the silicon powder with an excess carbon, and
  (2) silicon powder not involved in the reaction of (D) (1) starts to react with the nitriding gas to yield $Si_3N_4$, and
(E) reaction temperature is raised above the melting point of silicon up to about 1800° C. wherein no silicon particles remain unreacted with nitriding gas in the final fired product, said $Si_3N_4$ formed in steps (D) and (E) forming the interwoven texture with β-SiC without chemical linkage.

9. A process for fabricating an SiC-$Si_3N_4$ composite system for heat resistant materials having an interwoven texture of SiC and $Si_3N_4$ with micro gaps between SiC and $Si_3N_4$ crystals for absorption of thermal stresses, comprising firing in a nitriding gas atmosphere at a temperature of from 1200° C. to 1800° C., a green compact composed of 65% to 90% by weight of silicon powder having individual particle size equal to or less than about 44 microns and 35% to 10% by weight of an organic silicon polymer to produce a final SiC-$Si_3N_4$ composite system of 5% to 20% by weight of SiC and 95% to 80% by weight of $Si_3N_4$.

10. The process of claim 9 wherein said organic silicon polymer is of the structure selected from the group consisting of

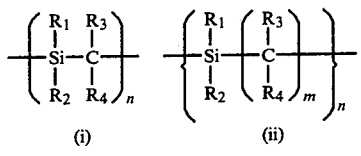

(i)      (ii)

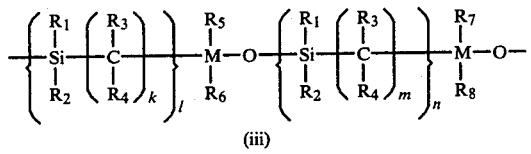

(iii)

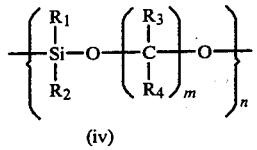

(iv)

and mixtures thereof, with any one or more of structural units (i)–(iv) forming part of a larger polymeric chain, wherein $R_1$ is $CH_3$, $R_2$, $R_3$, and $R_4$ are selected from the group consisting of hydrogen, alkyl, aryl, $(CH_3)_2CH-$, $(C_6H_5)_2SiH-$, $(CH_3)_3Si-$, and mixtures thereof, k, l, m, and n represent mean number of repetitions of the respective structural units, and in structural unit (iii), M is either a metallic or non-metallic element, $R_5$, $R_6$, $R_7$ and $R_8$ are selected from the group consisting of hydrogen, alkyl, aryl, $(CH_3)_2CH-$, $(C_6H_5)_2SiH-$, $(CH_3)_3Si-$, and mixtures thereof, and depending on the valency of M, any one or more of $R_5$, $R_6$, $R_7$ and $R_8$ may be absent from the polymeric chain.

11. The process of claim 10 comprising the steps of
(A) initially firing the green compact to a temperature above about 300° C. wherein the organic silicon polymer turns to a low viscosity liquid, substituents $R_1$–$R_8$ of structural formulas (i)–(iv) escape as volatile compounds, and skeletal components of carbon and silicon become amorphous;
(B) firing the compact to a temperature above about 800° C. wherein β-SiC crystals begin to form in the amorphous mixture of silicon and an excess of carbon;

(C) firing the compact to a temperature above about 1,000° C. wherein β-SiC crystal formation is accelerated by reaction of the silicon powder with an excess of carbon, said β-SiC crystals formed in step (C) chemically binding with the β-SiC crystals produced in step (B) in the amorphous structure between the silicon particles;

(D) firing the compact to a temperature above about 1200°0 C. wherein (1) β-SiC is produced by thermal denaturation of the organic silicon polymer and by reaction of the silicon powder with an excess of carbon, and (2) silicon powder not involved in the reaction of (D) (1) starts to react with the nitriding gas to yield $Si_3N_4$, and (E) raising reaction temperature above the melting point of silicon up to about 1800° C. wherein no silicon particles remain unreacted with nitriding gas in the final fired product, said $Si_3N_4$ formed in steps (D) and (E) forming the interwoven texture with β-SiC without chemical linkage.

* * * * *